US006951022B1

(12) United States Patent
Golde et al.

(10) Patent No.: US 6,951,022 B1
(45) Date of Patent: Sep. 27, 2005

(54) DELEGATE-BASED EVENT HANDLING

(75) Inventors: Peter H. Golde, Bellevue, WA (US); Anders Hejlsberg, Seattle, WA (US); Scott M. Wiltamuth, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 438 days.

(21) Appl. No.: 09/808,263

(22) Filed: Mar. 14, 2001

(51) Int. Cl.[7] .................................................. G06F 9/46
(52) U.S. Cl. ....................................................... 719/318
(58) Field of Search .......................................... 709/318

(56) References Cited

U.S. PATENT DOCUMENTS 5,724,589 A * 3/1998 Wold .......................... 709/318
5,742,778 A * 4/1998 Hao et al. ................... 345/759
6,134,559 A * 10/2000 Brumme et al. ........ 707/103 R
6,138,171 A * 10/2000 Walker ....................... 709/318
6,185,728 B1 * 2/2001 Hejlsberg ................... 717/109
6,292,849 B1 * 9/2001 Kimura et al. ................. 710/8

OTHER PUBLICATIONS

"Technical Articles: Delegates in Viusual J++ 6.0", *Microsoft Visual J++*, http://msdn.microsoft.com/visualj/technical/articles/delegates/default.asp, 1–9, (Sep. 1, 1998).
"Technical Articles: The Truth About Delegates", *Microsoft Visual J++*, Http://msdn.microsoft.com/visualJ/technical/articles/delegates/truth.asp, 1–12, (Sep. 14, 1998).

* cited by examiner

*Primary Examiner*—Meng-Al T. An
*Assistant Examiner*—Phuong N. Hoang
(74) *Attorney, Agent, or Firm*—Woodcock Washburn LLP

(57) ABSTRACT

A delegate-based event-driven programming model facilitates application development by allowing event handlers to be manipulated on an individual basis. In the delegate-based event-driven programming model, the recipient of an event need not be aware that is receiving the event because the event is treated as a call from a method. In addition, event handlers can be dynamically manipulated, such that recipients of events can be added or removed during runtime. Flexibility of event handling is improved as a result.

42 Claims, 6 Drawing Sheets

200

202

204

```
public delegate void EventHandler(object sender, EventArgs e);

public class Button
{
        public event EventHandler Click;

        public void Reset() {
                Click = null;
        }
}
```

```
public class Form1
{
        public Form1() {
                // Add Button1_Click as an event handler for Button1's Click
                Button1.Click += new EventHandler(Button1_Click);
        }

        Button Button1 = new Button();

        void Button1_Click(object sender, EventArgs e) {
                Console.WriteLine("Button1 was clicked!");
        }

        public void Disconnect() {
                button1.Click -= new EventHandler(Button1_Click);
        }
}
```

```
event-declaration:
    attributes_opt  event-modifiers_opt  event type  variable-declarators;
    attributes_opt  event-modifiers_opt  event type  member-name{  event-
        accessor-declarations  }

event-modifiers:
    event-modifier
    event-modifers event-modifier

event-modifier:
    new
    public
    protected
    internal
    private
    static
    virtual
    override
    abstract
    // not extern

event-accessor-declarations:
    add-accessor-declaration  remove-accessor-declaration
    remove-accessor-declaration  add-accessor-declaration

add-accessor-declaration:
    attributes_opt  add  block

remove-accessor-declaration:
    attributes_opt  remove  block
```

DELEGATE-BASED EVENT HANDLING

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2000, Microsoft Corp.

FIELD OF THE INVENTION

The invention relates generally to component-based computer programming languages. More particularly, the invention relates to event handling in such languages.

BACKGROUND

Events are an important part of component-based programming. An event is a component-issued notification that something of interest has occurred. For example, a program developer may use one, type of event to specify how the program should behave when the left mouse button is pressed while the mouse cursor is over a particular icon. The component issuing the event is known as an event source, while a component that receives the event is called an event listener. An object known as an event handler governs the particular behavior triggered by the event.

In the VISUAL BASIC® development system, commercially available from Microsoft Corp. of Redmond, Wash., a component can declare an event using the Event keyword and raise it using the RaiseEvent keyword, as illustrated by the following example:

```
Event MyEvent (ByVal i As Integer)
Sub MyMethod( )
    RaiseEvent MyEvent(123)
End Sub
```

An event can be handled by declaring a field with a WithEvents modifier, initializing the field, and providing an event handler whose name is specially named. In the following example, a composite class handles events for two instances of the MyComponent class.

```
Public WithEvents a As MyComponent
Public WithEvents b As MyComponent
Private Sub a_MyEvent(ByVal i As Integer)
    MsgBox "a raised MyEvent with param" & CStr(i)
End Sub
Private Sub b_MyEvent(ByVal i As Integer)
    MsgBox "b raised MyEvent with param" & CStr(i)
End Sub
Private Sub Class_Initialize( )
    Set a = New MyComponent
    Set b = New MyComponent
End Sub
```

Event support in the VISUAL BASIC® development system is based on an event infrastructure provided by Object Linking and Embedding (OLE) and OLE Automation, which define certain interfaces that enable the management of events. These interfaces allow one component to handle events for a different component. In this system, events are implemented using interfaces. A component indicates what events it raises by publishing information about one or more source interfaces. A component handles events for an event source by implementing one or more of these source interfaces and indicating its interest in events on a per-interface basis.

While the Java language itself does not specifically support events, the JavaBeans standard uses an interface-based event model similar to that used in OLE and OLE Automation. This model differs from the OLE/OLE Automation model, however, in the ways in which connections are managed. The OLE/OLE Automation model uses connection point interfaces to manage relationships between event sources and event listeners, while the JavaBeans model uses interfaces known as design patterns. In the JavaBeans model, to enable connection of event handlers, an event source supplies an AddXxxListener method that takes a parameter of interface type XxxListener.

Interfaces are essentially groupings of events, such as mouse-related events. These groupings are arbitrary and static, i.e., fixed at the time of development. In development systems in which interfaces are used for event handling, the developer is not able to manipulate event handlers on an individual basis. For example, even if the developer is only interested in using a mouse button click event, the developer must still write event handlers for the other events in the interface in which the mouse button click event is packaged.

Typically event handlers are sparse; most components have at least one handled event, but most events are unhandled. This mismatch between mechanism and usage results in additional overhead in a number of dimensions. For example, when many events appear in a single interface, the additional overhead includes unnecessary size and performance costs. In the worst case scenario, a component must provide many actual event handlers when only one event handler actually does anything useful.

JavaBeans allows a developer to use multiple interfaces. Unfortunately, using interfaces to provide finer granularity does not alleviate this problem. Instead of a single interface with N events, a component could provide N interfaces, each with a single event. Such a system would result in one interface per event and one class per handled event. Because the number of components is large, the number of events is large, as is the number of event handlers. As a result, considerable storage resources, both on disk and in memory, may be consumed.

Another drawback of interface-based event systems is that they do not support true pluggability. To connect two components, the source of the events must be provided with an implementation of an event interface. However, even if a component implements a method that is "plug compatible" with an event from another component, it is not possible to wire the method and the event together directly. The sink component would have to implement the event interface required by the source component, a rather unlikely scenario. To complete the wiring of two components, "glue code" must be provided. Pluggability could be a significant building block in the construction of high-level development tools and/or end-user focused development tools that allow pre-built components to be wired together without the need for generation and compilation of "glue" source code.

Another drawback is that conventional interface-based event systems do not provide automatic support for multicasting of events. Because neither standard nor default multicast behavior is provided, components' support for multicasting of events varies arbitrarily. Some components support multicast, but others do not. Among those components that do support multicast, some multicast in the order in which event handlers were connected, others do the opposite, and still others multicast in other ways.

Further, existing interface-based event systems are brittle with respect to versioning. Arguments are typically specified in an "unpacked" format that essentially hardwires the source and listener together. Because the declaration of an event handler specifically names the arguments of the event, it is difficult, if not impossible, for an event source to change the behavior of the event, e.g., by supplying an additional parameter, without breaking existing clients.

SUMMARY OF THE INVENTION

According to various implementations of the present invention, language constructs known as delegates are used to handle events. A delegate is an object that includes a pointer to a method as well as a pointer to an object to which the method is to be applied. Using this model, a recipient of an event need not be aware that it is receiving the event, as the event is treated like a call from a method. Dynamic event handling, the ability to add and remove recipients of an event during runtime, is facilitated as a result. In addition, events can be manipulated individually, rather than in arbitrary groupings, without undesired side effects.

In a particular implementation, an event handler method is invoked by calling another method of an instance of a class. Any parameters that are passed to the other method are also passed to the event handler method. Thus, the parameter lists of the event handler method and of the other method have the same signature. The event handler method is referenced by the other method, and an invocation list associated with the other method is created. This invocation list specifies one or more event handler methods to be invoked, and is modified dynamically.

In another implementation, an event handler method is invoked by calling another method that references the event handler method. Two parameters are passed both to the event handler method and to the other method: a sender parameter and an event arguments parameter. The sender parameter identifies an event source, and the event arguments parameter identifies one or more event arguments. The parameter lists of the event handler method and of the other method have compatible signatures. An invocation list is created; this invocation list specifies one or more event handler methods to be invoked and is associated with the other method. The contents of the invocation list are altered during execution of the object-based computer code.

Still other implementations include computer-readable media and apparatuses for performing the above-described methods. The above summary of the present invention is not intended to describe every implementation of the present invention. The figures and the detailed description that follow more particularly exemplify these implementations.

BRIEF DESCRIPTION OF THE DRAWINGS

FIG. 2 illustrates an example event declaration, according to a particular embodiment of the present invention.

FIG. 3 illustrates connection and disconnection of an event handler for an event, according to a particular embodiment of the present invention, FIG. 4 illustrates an example grammar for declaring an event, according to a particular embodiment of the present invention.

DETAILED DESCRIPTION

In the following detailed description of various embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
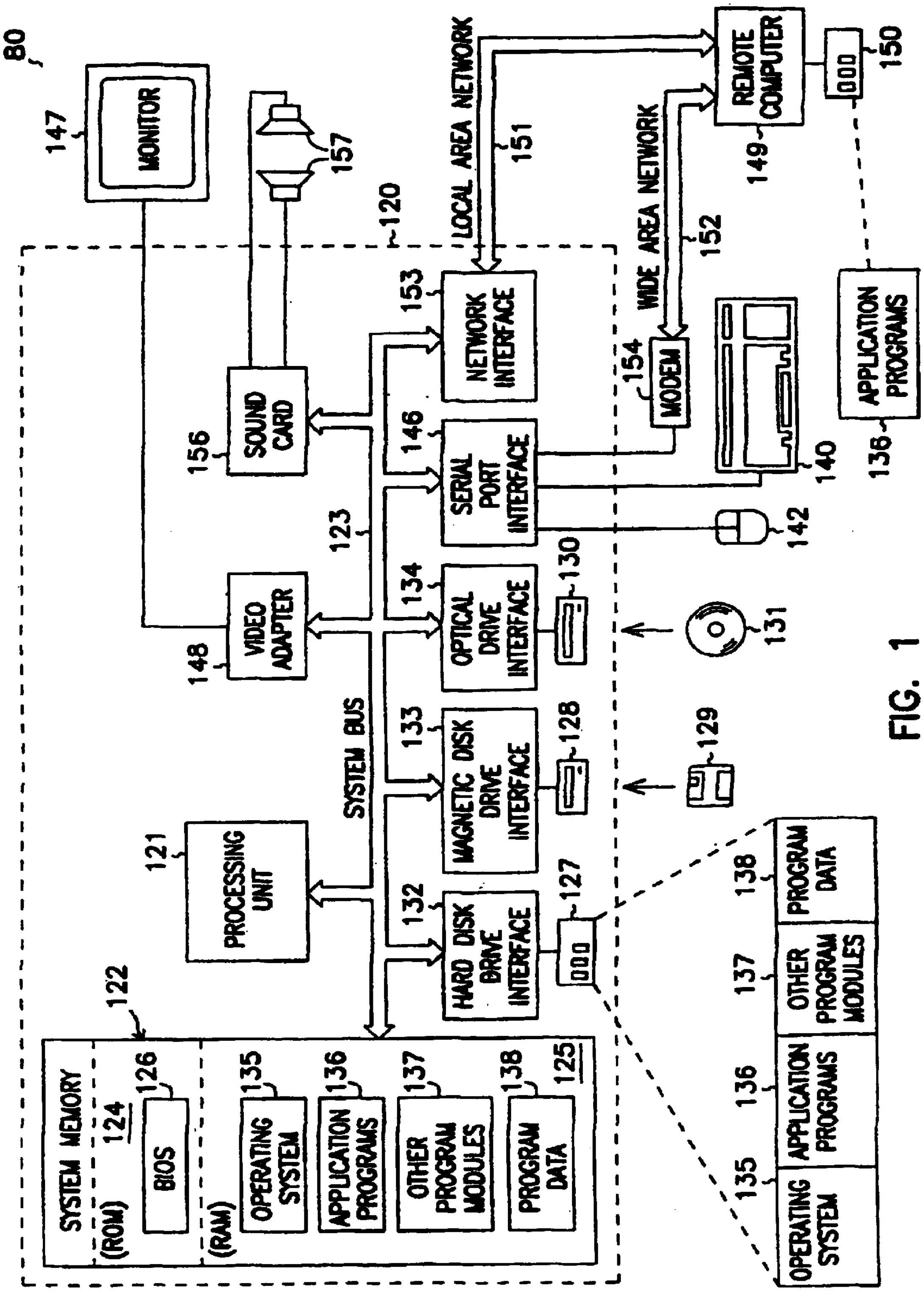
FIG. 1 illustrates a simplified overview of an example embodiment of a computing environment for the present invention.

FIG. 1 illustrates a hardware and operating environment in conjunction with which embodiments of the invention may be practiced. The description of FIG. 1 is intended to provide a brief, general description of suitable computer hardware and a suitable computing environment with which the invention may be implemented. Although not required, the invention is described in the general context of computer-executable instructions, such as program modules, being executed by a computer, such as a personal computer (PC). This is one embodiment of many different computer configurations, some including specialized hardware circuits to analyze performance, that may be used to implement the present invention. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network personal computers (PCs), minicomputers, mainframe computers, and the like. The invention may also be practiced in distributed computing environments where tasks are performed by remote processing devices linked through a communications network. In a distributed computing environment, program modules may be located in both local and remote memory storage devices.

FIG. 1 shows a computer arrangement implemented as a general purpose computing or information handling system 80. This embodiment includes a general purpose computing device, such as a personal computer (PC) 120, that includes. a processing unit 121, a system memory 122, and a system bus 123 that operatively couples the system memory 122 and other system components to the processing unit 121. There may be only one or there may be more than one processing unit 121, such that the personal computer 120 comprises a single central processing unit (CPU), or a plurality of processing units, commonly referred to as a parallel processing environment. The computer 120 may be a conventional computer, a distributed computer, or any other type of computer; the invention is not so limited.

In other embodiments, other configurations are used in the personal computer 120. The, system bus 123 may be any of several types, including a memory bus or memory controller, a peripheral bus, and a local bus, and may use any of a variety of bus architectures. The system memory 122 may also be referred to simply as the memory, and it includes a read only memory (ROM) 124 and a random access memory (RAM) 125. A basic input/output system (BIOS) 126 stored in the ROM 124, contains the basic routines that transfer information between components of the personal computer 120. The BIOS 126 also contains start-up routines for the system.

The personal computer 120 typically includes at least some form of computer-readable media. Computer-readable media can be any available media that can be accessed by the personal computer 120. By way of example, and not limitation, computer-readable media may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium that can be used to store the desired information and that can be accessed by the personal computer 120. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included in the scope of computer readable media.

By way of example, the particular system depicted in FIG. 1 further includes a hard disk drive 127 having one or more magnetic hard disks (not shown) onto which data is stored and retrieved for reading from and writing to a hard disk interface 132, a magnetic disk drive 128 for reading from and writing to a removable magnetic disk 129, and an optical disk drive 130 for reading from and/or writing to a removable optical disk 131, such as a CD-ROM, DVD, or other optical medium. The hard disk drive 127, magnetic disk drive 128, and optical disk drive 130 are connected to the system bus 123 by a hard disk drive interface 132, a magnetic disk drive interface 133, and an optical drive interface 134, respectively. The drives 127, 128, and 130 and their associated computer readable media 129, 131 provide nonvolatile storage of computer-readable instructions, data structures, program modules, and other data for the personal computer 120.

In various embodiments, program modules are stored on the hard disk drive 127, the magnetic disk 129, the optical disk 131, ROM 124, and/or RAM 125 and may be moved among these devices, e.g., from the hard disk drive 127 to RAM 125. Program modules include an operating system 135, one or more application programs 136, other program modules 137, and/or program data 138. A user may enter commands and information into the personal computer 120 through input devices such as a keyboard 140 and a pointing device 42. Other input devices (not shown) for various embodiments include one or more devices selected from a microphone, joystick, game pad, satellite dish, scanner, or the like. These and other input devices are often connected to the processing unit 121 through a serial port interface 146 coupled to the system bus 123, but in other embodiments they are connected through other interfaces not shown in FIG. 1, such as a parallel port, a game port, or a universal serial bus (USB) interface. A monitor 147 or other display device also connects to the system bus 123 via an interface such as a video adapter 148. In some embodiments, one or more speakers 157 or other audio input transducers are driven by a sound adapter 156 connected to the system bus 123. In some embodiments, in addition to the monitor 147, the system 80 includes other peripheral output devices (not shown), such as a printer or the like.

In some embodiments, the personal computer 120 operates in a networked environment using logical connections to one or more remote computers such as a remote computer 149. The remote computer 149 may be another personal computer, a server, a router, a network PC, a peer device, or other common network node. The remote computer 149 typically includes many or all of the components described above in connection with the personal computer 120; however, only a storage device 150 is illustrated in FIG. 1. The logical connections depicted in FIG. 1 include a local area network (LAN) 151 and a wide area network (WAN) 152, both of which are shown connecting the personal computer. 120 to the remote computer 149. Typical embodiments would only include one or the other. Such networking environments are commonplace in offices, enterprise-wide computer networks, intranets, and the Internet.

When placed in a LAN networking environment, the personal computer 120 connects to the local network 151 through a network interface or adapter 133. When used in a WAN networking environment, such as the Internet, the personal computer 120 typically includes a modem 154 or other means for establishing communications over the network 152. The modem 154 may be internal or external to the personal computer 120 and connects to the system bus 123 via the serial port interface 146 in the embodiment shown. In a networked environment, program modules depicted as residing within the personal computer 120 or portions thereof may be stored in the remote storage device 150. Of course, the network connections shown are illustrative, and other means establishing a communications link between the computers may be substituted.

Software may be designed using many different methods, including object-oriented programming methods. C++ and Java are two examples of common object-oriented computer programming languages that provide functionality associated with object-oriented programming. Object-oriented programming methods provide a means to encapsulate data members (variables) and member functions (methods) that operate on that data into a single entity called a class. Object-oriented programming methods also provide means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of invention are implemented as objects in some embodiments.

Example Embodiments

According to various embodiments of the present invention, a delegate-based event driven programming model is used to handle events. A delegate is an object that includes a pointer to a method as well as a pointer to an object to which the method is to be applied. By contrast, a function pointer contains only a reference to a function. Using the delegate-based model, a recipient of an event need not be aware that it is receiving the event, as the event is treated like a call from a method. Dynamic event handling, the ability to add and remove recipients of an event during runtime, is facilitated as a result. In addition, events can be manipulated individually, rather than in arbitrary groupings, without undesired side effects.

In the delegate-based event system of the present invention, a component exposes an event by providing a pair of specially named methods, e.g., add__Xxx and remove__Xxx that take an event handler in the form of a delegate. An add__Xxx call connects an event handler to an event, while a corresponding remove__Xxx call removes this connection.

Delegates enable scenarios that the C++ programming language and other programming languages, such as Pascal and Modula, have addressed with function pointers. Unlike function pointers, delegates are object-oriented and type-safe.

Delegates are reference types that derive from a common base class System.Delegate. A delegate instance encapsulates a method, which is a callable entity. For instance methods, a callable entity consists of an instance and a method on the instance. For static methods, a callable entity consists of a class and a static method on the class.

A useful property of a delegate is that the delegate need not be aware of the type or class of the object that it references. Rather, all that matters is that the parameter list of the referenced method is compatible with the delegate. This feature makes delegates quite useful for "anonymous" notification usage—a caller invoking a delegate need not know exactly what class or member is being invoked.

Like a function pointer, a delegate is a value. Like other values, it can be assigned to variables, passed from one procedure to another, etc. A delegate can also be used, applied, and called. Arguments may be passed to the delegate when performing this operation.

Defining and Using Delegates

There are three steps in defining and using delegates: declaration, instantiation, and invocation. Delegates are declared using delegate declaration syntax. For example, the declaration

```
delegate void SimpleDelegate( );
```

declares a delegate named SimpleDelegate that takes no arguments and returns void. As another example, the declaration

```
class Test
{
    static void F( ) {
        System.Console.WriteLine("Test.F");
    }
    static void Main( ) {
        SimpleDelegate d = new SimpleDelegate(F);
        d( );
    }
}
```

creates a SimpleDelegate instance and immediately calls it. The above example is provided primarily for illustrative purposes; as a practical matter, it is simpler to call the method directly rather than by using a delegate. Delegates are particularly useful in situations in which their anonymity may be exploited. For example, the MultiCall method that follows repeatedly calls a SimpleDelegate:

```
void MultiCall(SimpleDelegate d, int count) {
    for (int i = 0; i < count; i++) {
        d( );
    }
}
```

In this example, the MultiCall method does not know or care what type method is the target method for the SimpleDelegate, what accessibility this method has, or whether the method is static or non-static. All that matters is that the signature of the target method is compatible with SimpleDelegate.

Delegates are described more fully in copending U.S. patent application Ser. No. 09/089,619, entitled METHOD, SOFTWARE, AND APPARATUS FOR REFERENCING A METHOD IN OBJECT-BASED PROGRAMMING, filed Jun. 3, 1998 and assigned to the instant assignee, the disclosure of which is hereby incorporated herein in its entirety.

Delegate-Based Event Handling

According to a particular embodiment, an event is a member that allows an object or class to provide notifications. A class defines an event by providing an event declaration. The event declaration resembles a field declaration, but with an added event keyword and an optional set of event accessors. The type of this declaration is a delegate type.

Delegate-based event handling provides a number of advantages over interface-based event handling. For example, as discussed above, interface-based event handlers typically have coarse granularity—most components have at least one handled event, but most events are unhandled. Significant overhead, e.g., size and performance, costs result, especially when many events appear in a single interface. The delegate-based event handling techniques of the present invention address this shortcoming by connecting event handlers on a per-event granularity rather than on a per-event-interface granularity. Overhead costs are thus reduced.

Moreover, the delegate-based event handling system is more pluggable than interface-based systems. Delegate-based event handling involves an event source, a method that is compatible with the event source, and an event handler delegate that connects the event source and the handler method. Pluggability is further enhanced by the use of the (object sender, EventArgs e) convention, which enables event routing and forwarding capabilities that are crucial for pluggability.

Also, automatic multicasting of events is supported by the delegate-based event handling system of the present invention. The Delegate base class provides Combine and Remove methods that supply automatic and standard multicast behavior. Developers can either use this automatic support or define their own data structure for storing event handlers, manually raising events using customized mechanisms.

Referring again to the drawings, FIG. 2 depicts an example event declaration 200. In this example, a Button class 202 defines a Click event of type EventHandler. Inside the Button class 202, the Click member correspond exactly to a private field 204 of type EventHandler. Outside the Button class 202, however, the Click member can only be used on the left-hand side of the += and −= operators. The += operator adds an event handler for the event, while the −= operator removes an event handler for the event.

FIG. 3 illustrates the connection and disconnection of an event handler for an event, according to a particular embodiment of the present invention. In this example, a Form1 class 302 adds an event handler Button1_Click for Button1's Click event. In a Disconnect method 304, the event handler Button1_Click is removed from the Click event.

For a simple event declaration such as:

```
public event EventHandler Click;
```

the compiler automatically provides the implementation underlying the += and −= operators.

If more control is desired, add and remove accessors can be explicitly provided instead. For example, the Button class can be rewritten to include add and remove accessors as follows:

```
public class Button
{
    private EventHandler handler;
    public event EventHandler Click {
        add { handler += value; }
        remove {handler -= value; }
    }
}
```

With the Button class thus written, implementation flexibility is improved. For example, the event handler for Click need not be represented by a field.

In a particular embodiment of the present invention, a convention is defined and used to support event handling by derived classes, thereby facilitating use in situations involving inheritances. With the use of conventions, a derived class can perform a wide variety of actions when a base class raises an event that it provides, such as pre-processing, post-processing, cancellation, modification of event arguments, and other actions. In addition, the derived class is also able to raise the event itself.

A convention is a non-sealed class that supports an event named Xxx, and that also supplies a protected method named OnXxx . This method takes the parameters for the event Xxx and is used when raising the event. A derived class can override and call this method in order to perform pre-processing, post-processing, cancellation, modification of event arguments, and other actions when a base class raises an event. For example, if a base class provides an event, a derived class may perform any of a variety of activities using a convention. These activities include, but are not limited to, raising the event that was defined in the base class, pre- and/or post-processing for the event (i.e., executing code before and/or after all event handlers have run), cancelling an event that was raised by the base class, and modifying the arguments for an event that was raised by the base class. As a particular example, a derived class can perform pre-processing by overriding OnXxx and providing an implementation that performs some processing and then calls the base class.

Referring again to the drawings, FIG. 4 depicts an example grammar 400 for declaring an event, according to a particular embodiment of the present invention. According to the present invention, the grammar 400 must be a delegate, and must be at least as accessible as the event itself. An event is a member that enables an object or class to provide notifications. Clients can attach executable code for events by supplying event handlers. In this embodiment, events are declared using an event declaration similar in format to the example grammar 400.

The grammar 400 optionally includes a set of attributes 402 and one or more event modifiers. The event modifiers may include, for example, a new event modifier 404 and a valid combination of the four access modifiers 406, i.e., public, protected, internal, and private. In addition, the event modifiers may include any one event modifier 408 selected from the static modifier, the virtual modifier, the override modifier, and the abstract modifier. These modifiers denote different types of events and are described more fully below. None of these event modifiers 408 need be included, however.

The grammar 400 also may include two event accessor declarations 410, which are described in greater detail below. Alternatively, the compiler may be relied on to supply these accessors automatically. If the event accessor declarations 410 are omitted, one event is defined for each event specified in a set of variable declarators 412. An abstract event is declared when event accessor declarations 410 are omitted. The grammar 400 cannot include both the abstract modifier and event accessor declarations 410.

An event can be used as the left hand operand of two operators, += and −=. These operators are used, respectively, to attach a handler to an event and to remove a handler from an event. The access modifiers of the event—public, protected, internal, and private—control the contexts in which operations are permitted. Because += and −= are the only operations that are permitted on an event outside the type that declares the event, external code can add and remove handlers for an event, but cannot in any other way obtain or modify the underlying list of event handlers.

Within the program text of the class or structure that contains the declaration of an event, certain events can be used like fields. To be used in this way, an event must not be abstract, and must not explicitly include event accessor declarations. Such an event can be used in any context that permits a field.

In the example

```
public class Button:Control
{
    public event EventHandler Click;
    protected void OnClick(EventArgs e) {
        if(Click != null) Click(this, e);
    }
    public void Reset( ) {
        Click = null;
    }
}
```

Click is used as a field within the Button class. As the example demonstrates, the field can be examined, modified, and used in delegate invocation expressions. The OnClick method in the Button class "raises" the Click event. The notion of raising an event is equivalent to invoking the delegate represented by the event. Accordingly, there are no special language constructs for raising events. It should be noted that the delegate invocation is preceded by a check to ensure that the delegate is non-null.

Outside the declaration of the Button class, the Click member can only be used on the left hand side of the += and −= operators. For example, the operation

```
b.Click += new EventHandler( . . . );
```

appends a delegate to the invocation list of the Click event. Similarly, the operation

```
b.Click -= new EventHandler( . . . );
```

removes a delegate from the invocation list of the Click event.

In an operation of the form x+=y or x−=y, where x is an event and the reference occurs outside the type that contains the declaration of x, the result of the operation is void, rather than the value of x after the assignment. This rule prevents external code from indirectly examining the underlying delegate of an event.

Event handlers can be attached to instances of the Button class above as in the following example:

```
public class LoginDialog: Form
{
    Button OkButton;
    Button CancelButton;
    public LoginDialog( ) {
        OkButton = new Button( );
        OkButton.Click += new EventHandler(OkButtonClick);
        CancelButton = new Button( );
        CancelButton.Click += new EventHandler(CancelButtonClick);
    }
    void OkButtonClick(object sender, EventArgs e) {
        // Handle OkButton.Click event
    }
    void CancelButtonClick(object sender, EventArgs e) {
        // Handle CancelButton.Click event
    }
}
```

In this example, the LoginDialog constructor creates two Button instances and attaches event handlers to the Click events.

Event Accessors

Event declarations typically omit the event accessor declarations 410 of FIG. 4. In cases in which the storage cost of one field per event is not acceptable, a class can include event accessor declarations and use a developer-specified mechanism for storing the list of event handlers. This approach is desirable, for example, in scenarios in which most events are unhandled. In such scenarios, the ability to specify event accessors allows the developer to make design tradeoffs between space and speed.

The event accessor declarations of an event specify the executable statements associated with adding and removing event handlers. The accessor declarations include add accessor declarations and remove accessor declarations. Each accessor declaration consists of the token add or remove followed by a block. The block associated with an add accessor declaration specifies the statements to execute when an event handler is added, while the block associated with a remove accessor declaration specifies the statements to execute when an event handler is removed.

An event accessor, whether an add accessor declaration or a remove accessor declaration, corresponds to a method with a single value of the event type and a void return type. The implicit parameter of an event accessor is always named value. Because an event accessor implicitly has a parameter named value, a local variable declaration in an event accessor cannot also use the name value. When an event is used in an event assignment, the appropriate event accessor is used. For example, if the assignment operator is +=, the add accessor is used. Similarly, if the assignment operator is −=, the remove accessor is used. In either case, the right hand side of the assignment operator is used as the argument to the event accessor. The block of an add accessor declaration or a remove accessor declaration must conform to the rules for void methods. In particular, return statements in such a block are not permitted to specify an expression.

In the example

```
class Control: Component
{
        // Unique keys for events
        static readonly object mouseDownEventKey = new
        object( );
        static readonly object mouseUpEventKey = new
        object( );
    // Return event handler associated with key
    protected Delegate GetEventHandler(object key) { . . . }
    // Add event handler associated with key
    protected void AddEventHandler(object key, Delegate handler)
    { . . . }
    // Remove event handler associated with key
    protected void RemoveEventHandler(object key, Delegate
    handler) { . . . }
    // MouseDown event
    public event MouseEventHandler MouseDown {
        add {AddEventHandler(mouseDownEventKey, value); }
        remove {AddEventHandler(mouseDownEventKey,
        value); }
    }
    // MouseUp event
    public event MouseEventHandler MouseUp {
        add {AddEventHandler(mouseUpEventKey, value); }
        remove {AddEventHandler(mouseUpEventKey, value); }
    }
}
```

the Control class implements an internal storage mechanism for events. The AddEventHandler method associates a delegate value with a key. The GetEventHandler method returns the delegate currently associated with a key. The RemoveEventHandler method removes a delegate as an event handler for the specified event. In the interest of efficiency, the underlying storage mechanism should be designed such that there is no cost for associating a null delegate value with a key, so that unhandled events consume no storage.

When a class declares an event, the compiler automatically generates the add_X and remove_X methods. For example, the declaration

```
class Button
{
    public event EventHandler Click;
}
```

is equivalent to

```
class Button
    {
    public event EventHandler Click;
    public void add_Click(EventHandler handler) {
        Click += handler;
    }
    public void remove_Click(EventHandler handler) {
        Click −= handler;
    }
}
```

Further, the compiler also generates an event that references the add_X and remove_X methods. As a result, when a class declares an event X of a delegate type T, the signatures

```
void add_X(T handler);
```

and

```
void remove_X(T handler);
```

are reserved and cannot be used by the same class to declare another method.

Static Events

When an event declaration includes a static modifier, the event is said to be a static event. When no static modifier is present, the event is considered an instance event. A static event is not associated with a particular instance. As a result, the accessors of a static event cannot refer to a static event using the word "this." Also, the virtual, abstract, and override modifiers cannot be included in a static event.

By contrast, an instance event is associated with a particular instance of a class, and can be accessed using the word "this" by the accessors of the event.

Both static and instance events can be referenced in a member access of the form E.M. If M is a static event, E must denote a type. If, on the other hand, M is an instance event, E must denote an instance.

Virtual Events

When an instance event includes a virtual modifier, it is said to be a virtual event. When no virtual modifier is present, the event is considered a non-virtual event. A virtual event cannot also include any of the modifiers static, abstract, or override. The implementation of a non-virtual event is invariant, whether the event is accessed on an instance of the class in which it is declared or on an instance of a derived class. By contrast, the implementation of a virtual event can be changed by derived classes. The process of changing the implementation of an inherited virtual event is known as overriding the event.

For every virtual event declared in or inherited by a class, there exists a most derived implementation of the event with respect to that class. The most derived implementation of a virtual event E with respect to a class R is determined as follows. If R contains the introducing virtual declaration of E, then this is the most derived implementation of E. Otherwise, if R contains an override of E, then this is the most derived implementation of E. Otherwise, the most derived implementation of R is the same as that of the direct base class of E. Because events are allowed to hide inherited events, a class can contain several virtual events with the same signature. This does not present an ambiguity problem, since all but the most derived event are hidden.

Override Events

When an instance event declaration includes an override modifier, the event is said to be an override event. An override event overrides an inherited virtual event with the same signature. While a virtual event declaration introduces a new event, an override event declaration specializes an existing inherited virtual event by providing a new implementation of the event accessors. An override event cannot also include any of the new, static, or virtual modifiers.

The event overridden by an override declaration is known as an overridden base event. For an override event E declared in a class C, the overridden base event is determined by examining each base class of C, starting with the direct base class of C and continuing with each successive direct base class, until an accessible event with the same signature as the override event E is located. For purposes of locating the overridden base event, an event is considered accessible if it is public, if it is protected, if it is protected internal, or if it is internal and declared in the same program as the class C.

For an override declaration to be valid, the compiler must be able to locate a overridden base event by examining each base class of C to find an accessible event with the same signature as the override event E. Further, the overridden base event must be a virtual, abstract, or override event. The overridden base event cannot be a static or non-virtual event. Also, the override declaration and the overridden base event must have the same declared accessibility. That is, an override declaration cannot change the accessibility of the event. If any of these conditions is violated, a compile-time error is generated.

An override declaration can access the overridden base event using a base access, such as in the following example:

```
class A
{
    public virtual event EventHandler E;
}
class B:A
{
    public override event EventHandler E {
        add { base.E += value; }
        remove { base.E -= value; }
    }
}
```

In this example, the class B's override of the event E uses a base access base.E to refer to the event declared in the class A. A base access disables the virtual invocation mechanism and treats the base event as a non-virtual event. Had the accesses in the class B been written as ((A)this).E, it would recursively access the event E declared in the class B, not the one declared in the class A.

Only by including an override modifier can an event override another event. In this way, events behave like methods.

Abstract Events

When an instance event declaration includes an abstract modifier, the event is said to be an abstract event. An abstract event is also implicitly a virtual event. An abstract event declaration introduces a new virtual event, but does not provide an implementation of the event's accessors. Instead, non-abstract derived classes are required to provide their own implementation for the accessors by overriding the event. For an abstract event, event accessor declarations cannot be specified, as there is no implementation to specify.

Abstract event declarations are only permitted in abstract classes. An abstract event declaration cannot also contain either the static or virtual modifiers. In addition, a base access cannot reference an abstract event. For example, the following code would produce an error:

```
abstract class A
{
    public abstract event EventHandler E;
}
class B:A
{
    public override event EventHandler E {
        add {base.E += value; }        // Error, base.E is abstract
        remove {base.E -= value; }  // Error, base.E is abstract
    }
}
```

An error is produced for the base.E accesses because they reference an abstract event, namely E.

Interface Events

Interface events are declared using interface event declarations, e.g.:

interface-event-declaration:

attribute$_{opt}$ new$_{opt}$ event type identifier;

The attributes, type, and identifier of an interface event declaration have the same meaning as those of an event declaration in a class.

Definition of Event Standards

According to a particular embodiment of the present invention, event standards are defined by specifying how events are represented in metadata, and how the main event operations are exposed by a component. The main event operations consist of adding an event handler and removing an event handler. A component supplies these operations by providing methods named add__Xxx and remove__Xxx, where Xxx is the name of the event. These methods take a single argument, the event handler (a delegate) to add or remove.

Event declarations can be automatically translated to provide these methods by the compiler, according to an embodiment of the invention. For example, the simple event declaration

```
public event EventHandler Click;
```

is translated into a field and a pair of methods:

```
private EventHandler __Click Handler;
public void add__Click (EventHandler handler) {
    __ClickHandler += handler;
}
public void remove__Click (EventHandler handler) {
    __ClickHandler -= handler;
}
```

An event declaration that includes add and remove accessors, such as:

```
private EventHandler ClickHandler;
public event EventHandler Click {
    add { ClickHandler += value; }
    remove {ClickHandler -= value; }
}
```

is translated to:

```
private EventHandler ClickHandler;
public void add__Click(EventHandler handler) {
    ClickHandler += handler;  // body from add
}
public void remove__Click(EventHandler handler) {
    ClickHandler -= handler;  // body from remove
}
```

That is,

```
add {ClickHandler+=value;}
```

is translated to

```
public void add__Click(EventHandler handler) {
    ClickHandler += handler;
}
```

and

```
remove {ClickHandler-=value;}
```

is translated to

```
public void remove__Click(EventHandler handler) {
    ClickHandler -= handler;
}
```

Operations on Delegates

Delegates can be used as operands for a number of operations. For example, the operation x+y, where both x and y are delegates, is used to combine delegates. Similarly, the operation x−y is used to remove delegates. As discussed above, the operation x+=y is used to add an event handler to an event. This operation is equivalent to the operation x=x+y, with x evaluated only once. The operation x−=y is used to remove an event handler from an event, and is equivalent to the operation x =x−y, with x evaluated only once.

The += and −= operations are of particular importance to the event handling system of the present invention. From an external viewpoint, an event behaves like a delegate-valued field that only supports the += and −= operators.

Operations on delegates are particularly useful for implementing multicasting of events to several event handlers. Using the +and − operators, event handlers can be added and removed from an invocation list of methods to be invoked. For example, the operation $$e3=e1+e2$$

causes all of the methods of e1 to be invoked, followed by all of the events of e2. Similarly, the operation $$e3=e3-e1$$

removes the methods of e1 from the invocation list.

Event Arguments

By convention, all events have two parameters: a sender parameter that designates the object that raised the event, and an event arguments parameter that designates the event arguments. The event arguments parameter is always of type EventArgs or a class that derives from EventArgs. Separating the sender parameter from the other event arguments helps optimize the case in which no arguments are associated with the event. In this situation, an event can be raised without instantiating any objects. The arguments for such an event are the sender, which existed before the event was raised, and the static value represented by EventArgs.Empty. This optimization is important for a small number of events that have no parameters, and that are raised often. Moreover, the packaging of the event arguments other than the sender into a single argument with a common base class EventArgs allows for a wide range of routing and handling scenarios. For example, one can write an event log that handles any kind of event. Creation of such a component is greatly facilitated by packaging event parameters in this way.

Furthermore, the packaging of the event arguments other than the sender into a single argument allows more flexible versioning compared to a case with unpackaged event arguments. This advantage is readily apparent upon consideration of the following example, in which a component has an event that takes three integer arguments, i, j, and k:

```
public delegate void EEventHandler (int i, int j, int k);
public class EventSource
{
    public event EEventHandler E;
}
```

An event handler for EventSource would write event handlers, such as es.E in the below example, with a signature that matches EEventHandler:

```
public class EventListener
{
    EventSource es;
    public EventListener( ) {
        es = new EventSource ( );
        es.E += new EEventHandler(es_E);
    }
    void es_E(int i, int j, int k) { . . . };
```

An approach using unpackaged event arguments lacks flexibility. If EventSource needs to pass an additional argument to the event E, for example, it is unable to change the signature for E, as this would break existing clients, such as EventListener, with respect to both source code compatibility and binary compatibility. To pass an additional argument to the event E, EventSource can at best, in this example, add a new event that includes the additional argument. To obtain the new information represented by the additional argument, clients would need to handle the new event rather than the original event. Versioning in this way is unnecessarily awkward.

To address this issue, a subclass of event arguments EventArgs is created:

```
public class EEventArgs: EventArgs
{
    public int i;
    public int j;
    public int k;
```

-continued

```
    public EEventArgs (int i, int j, int k) { . . . }
}
public delegate void EEventHandler(object sender, EEventArgs e);
public class EventSource
{
    public event EEventHandler;
}
```

In this example, there is no problem with respect to versioning. Client code such as:

```
public class EventListener
{
    EventSource es;
    public EventListener( ) {
        es = new EventSource( );
        es.E += new EEventHandler(es_E);
    }
    void es_E(object sender, EEventArgs e) { . . . }
}
```

does not need to be modified due to the addition of a new field in EEventArgs.

Operational Example

Understanding of the operation of various embodiments of the present invention may be facilitated by consideration of an operational example. For purposes of this example, the following source code is considered:

```
// EventExample.cs
using Console = System.Console;
public delegate void EventHandler(object sender, EventArgs e);
public class EventArgs
{
    public static EventArgs = Empty new EventArgs( );
}
public class Button
{
    public event EventHandler Click;
    public string Caption;
    protected void OnClick(EventArgs e) {
        if(Click != null) Click(this, e);
    }
    public void SimulateClick( ) {
        OnClick(EventArgs.Empty);
    }
}
class Form
{
    public Button OkButton;.
    public Button CancelButton;
    public Form( ) {
        OkButton = new Button( );
        CancelButton = new Button( );
        OkButton.Caption = "OK";
        CancelButton.Caption = "Cancel";
        OkButton.Click += new EventHandler(OkButton_Click);
        CancelButton.Click += new
        EventHandler(CancelButton_Click);
    }
    void OkButton_Click(object sender, EventArgs e) {
        Console.WriteLine("OkButton_Click");
    }
    void CancelButton_Click(object sender, EventArgs e) {
        Console.WriteLine("CancelButton_Click");
    }
}
class Test
```

-continued

```
{
    static void Main( ) {
        Form f = new Form( );
        f.OkButton.SimulateClick( );
        f.CancelButton.SimulateClick( );
    }
}
```

Figure 5:
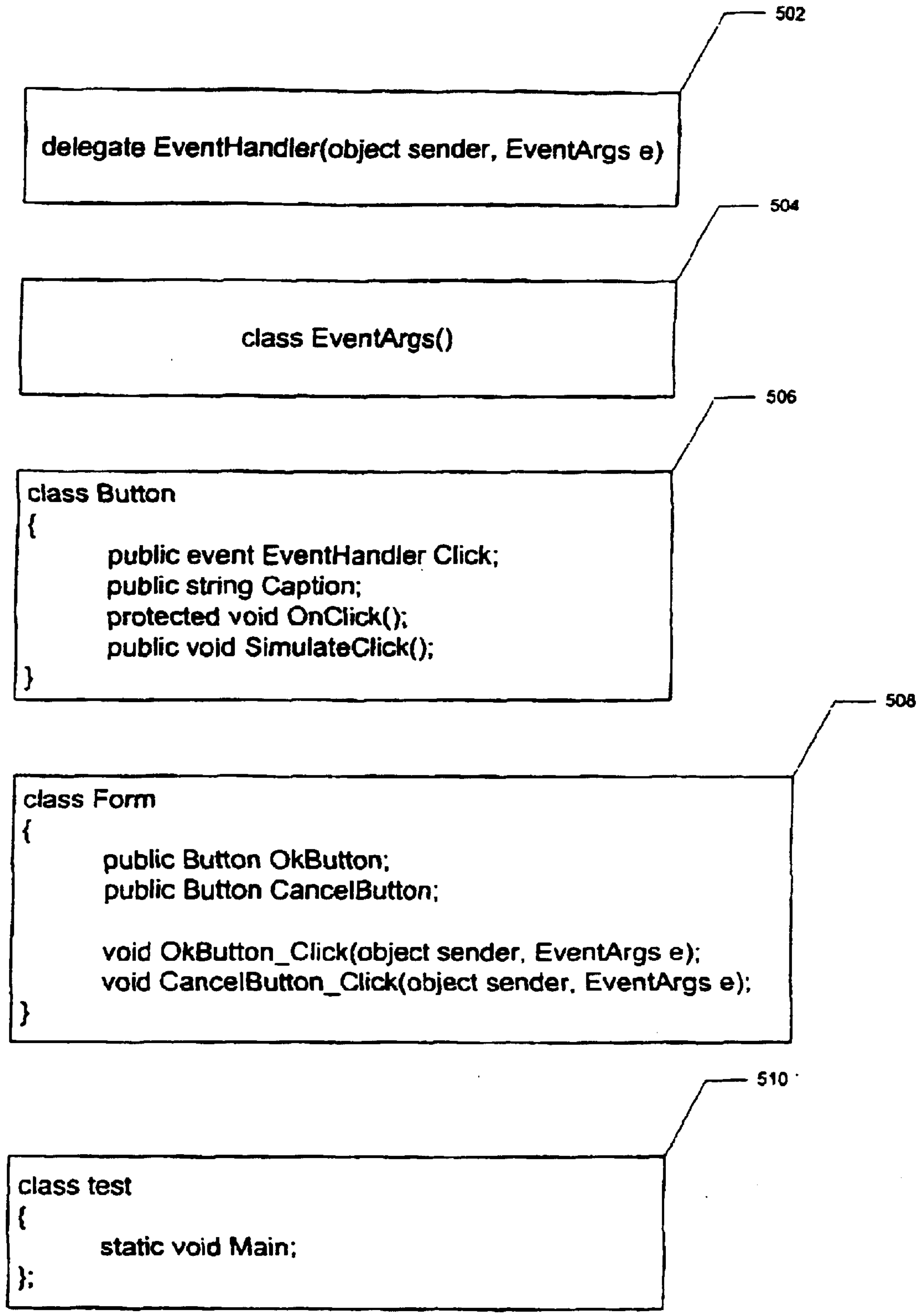
FIG. 5 depicts classes created according to an operational example of an embodiment of the present invention.
Figure 6:
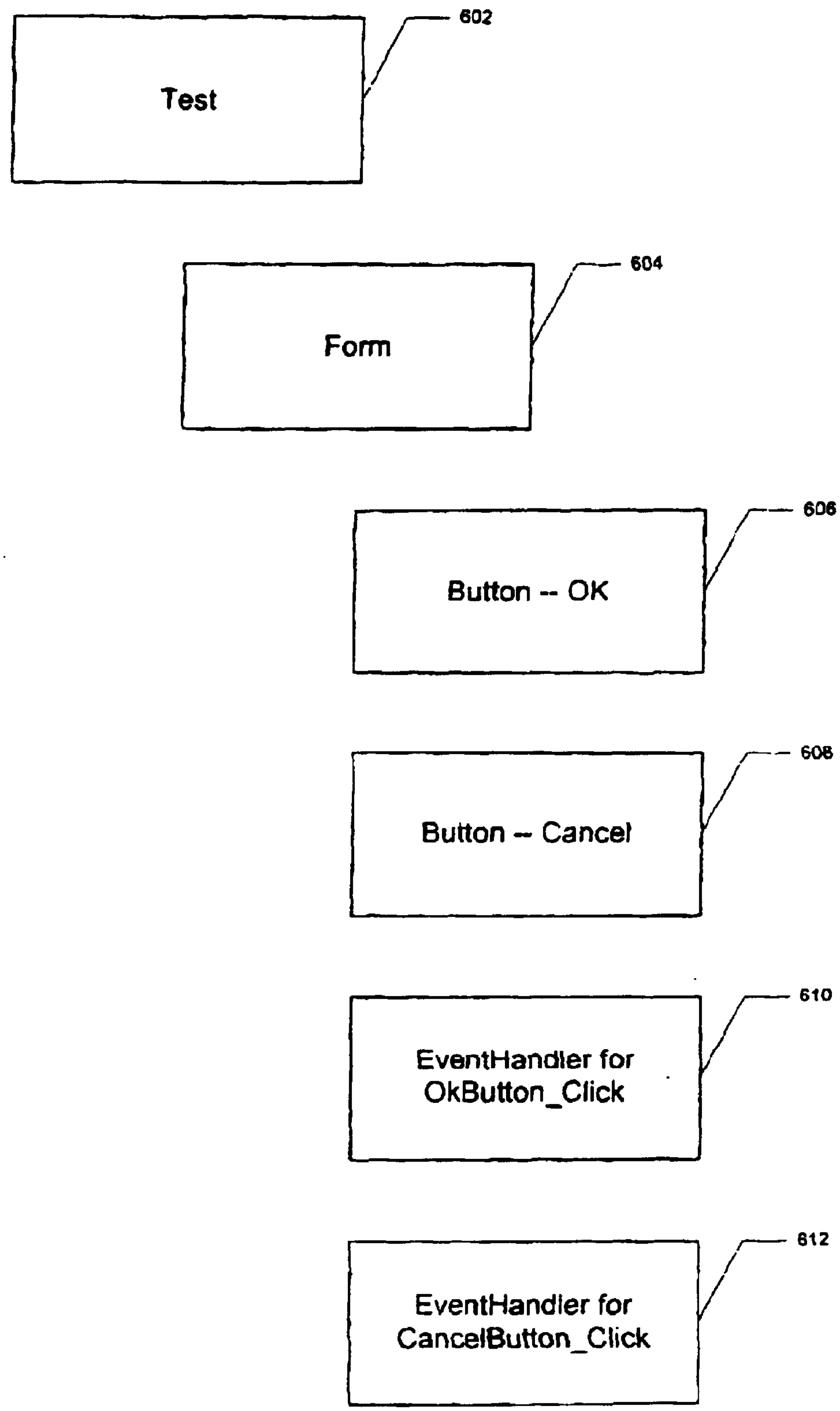
FIG. 6 depicts instantiation of objects according to the operational example of FIG. 5.

The above example code results in the creation of five classes depicted in FIG. 5: an EventHandler delegate 502, an EventArgs class 504, a Button class 506, a Form class 508, and a Test class 510. The Button class 506 exposes an event named Click. The classes illustrated in FIG. 5 are instantiated as shown in FIG. 6. As illustrated in FIG. 6, the Test class 510 of FIG. 5 uses an instance 602, which in turn uses an instance 604 of the Form class 508 of FIG. 5. The Form class 508 uses several instances, including an "OK Button" instance 606 of the Button class 506 and a "Cancel Button" instance 608 of the Button class 506. The Form class 508 also provides event handler instances 610 and 612 for the Click event of each button. These event handlers are attached to the Button instances 606 and 608, respectively.

CONCLUSION

The delegate-based event driven programming model of the present invention allows components to receive events without knowledge that they are receiving events, as events are treated like calls from methods. As a result, dynamic event handling and multicasting of events are facilitated. Further, events can be handled individually rather than in arbitrary groupings without undesired side effects.

While the embodiments of the invention have been described with specific focus on their embodiment in a software implementation, the invention as described above is not limited to software embodiments. For example, the invention may be implemented in whole or in part in hardware, firmware, software, or any combination thereof. The software of the invention may be embodied in various forms, such as a computer program encoded in a machine-readable medium, such as a CD-ROM, magnetic medium, ROM or RAM, or in an electronic signal. Further, as used in the claims herein, the term "module" shall mean any hardware or software component, or any combination thereof.

What is claimed is:

1. A method for operating a computer using object-based computer code, the method comprising:

invoking an event handler method configured to handle a static event, using a delegate, by calling another method of an instance of a class for which parameters passed to the other method are also passed to the event handler method, wherein the parameters passed to the other method and to the event handler method comprise a sender parameter identifying an event source and an event arguments parameter comprising a package of a plurality of event arguments, a parameter list of the other method having a same signature as a parameter list of the event handler method, wherein the other method references the event handler method, and the delegate contains a reference to the other method;

creating an invocation list associated with the other method, the invocation list specifying one or more event handler methods to be invoked;

dynamically altering contents of the invocation list; and referencing the static event using a member access of the form E.M, wherein E denotes a type and M denotes the static event.

2. The method of claim 1, further comprising adding an event handler method to the invocation list during execution of the object-based computer code.

3. The method of claim 2, further comprising using an event accessor to add the event handler method to the invocation list during execution of the object-based computer code.

4. The method of claim 2, further comprising using an addition operator to add the event handler method to the invocation list during execution of the object-based computer code.

5. The method of claim 1, further comprising removing an event handler method from the invocation list during execution of the object-based computer code.

6. The method of claim 5, further comprising using an event accessor to remove the event handler method from the invocation list during execution of the object based computer code.

7. The method of claim 5, further comprising using a subtraction operator to remove the event handler method from the invocation list during execution of the object-based computer code.

8. A method for operating a computer using object-based computer code, the method comprising:

invoking an event handler method configured to handle a static event, using a delegate, by calling another method, wherein the other method references the event handler method, and the delegate contains a reference to the other method;

passing a sender parameter identifying an event source and an event arguments parameter to the other method and to the event handler method, parameter lists of the event handler method and the other method having compatible signatures, wherein the events arguments parameter comprises a package of a plurality of event arguments;

creating an invocation list associated with the other method, the invocation list specifying one or more event handler methods to be invoked;

altering contents of the invocation list during execution of the object-based computer code; and referencing the static event using a member access of the form E.M, wherein E denotes a type and M denotes the static event.

9. The method of claim 8, further comprising adding an event handler method to the invocation list during execution of the object-based computer code.

10. The method of claim 9, further comprising using an event accessor to add the event handler method to the invocation list during execution of the object-based computer code.

11. The method of claim 9, further comprising using an addition operator to add the event handler method to the invocation list during execution of the object-based computer code.

12. The method of claim 8, further comprising removing an event handler method from the invocation list during execution of the object-based computer code.

13. The method of claim 12, further comprising using an event accessor to remove the event handler method from the invocation list during execution of the object-based computer code.

14. The method of claim 12, further comprising using a subtraction operator to remove the event handler method from the invocation list during execution of the object-based computer code.

15. A computer-readable medium having stored thereon a plurality of computer-executable modules, the computer-executable modules comprising:

an event source module configured to issue a static an event; and an event handler module configured to invoke an event handler method, using a delegate, by calling another method of an instance of a class for which parameters passed to the other method are also passed to the event handler method, wherein the parameters passed to the other method and to the event handler method comprise a sender parameter identifying an event source and an event arguments parameter comprising a package of a plurality of event arguments, a parameter list of the other method having a same signature as a parameter list of the event handler method, wherein the other method references the event handler method, and the delegate contains a reference to the other method, reference the static event, create an invocation list associated with the other method, the invocation list specifying one or more event handler methods to be invoked, dynamically alter contents of the invocation list, and reference the static event using a member access of the form E.M, wherein E denotes a type and M denotes the static event.

16. The computer-readable medium of claim 15, wherein the event handler module is further configured to add an event handler method to the invocation list during execution of the object-based computer code.

17. The computer-readable medium of claim 16, wherein the event handler module is further configured to use an event accessor to add the event handler method to the invocation list during execution of the object-based computer code.

18. The computer-readable medium of claim 16, wherein the event handler module is further configured to use an addition operator to add the event handler method to the invocation list during execution of the object-based computer code.

19. The computer-readable medium of claim 15, wherein the event handler module is further configured to remove an event handler method from the invocation list during execution of the object-based computer code.

20. The computer-readable medium of claim 19, wherein the event handler module is further configured to use an event accessor to remove the event handler method from the invocation list during execution of the object-based computer code.

21. The computer-readable medium of claim 19, wherein the event handler module is further configured to use a subtraction operator to remove the event handler method from the invocation list during execution of the object-based computer code.

22. A computer-readable medium having stored thereon a plurality of computer-executable modules, the computer-executable modules comprising:

an event source module configured to issue a static event; and an event handler module configured to invoke an event handler method, using a delegate, by calling another method, wherein the other method references reference the event handler method, and the delegate contains a reference to the other method, pass a sender parameter identifying an event source and an event arguments parameter to the other method and to the event handler method, parameter lists of the event handler method and the other method having compatible signatures, wherein the events argument parameter comprises a package of a plurality of event arguments, create an invocation list associated with the other method, the invocation list specifying one or more event handler methods to be invoked, alter contents of the invocation list during execution of the object-based computer code, and reference the static event using a member access of the form E.M, wherein E denotes a type and M denotes the static event.

23. The computer-readable medium of claim 22, wherein the event handler module is further configured to add an event handler method to the invocation list during execution of the object-based computer code.

24. The computer-readable medium of claim 23, wherein the event handler module is further configured to use an event accessor to add the event handler method to the invocation list during execution of the object-based computer code.

25. The computer-readable medium of claim 23, wherein the event handler module is further configured to use an addition operator to add the event handler method to the invocation list during execution of the object-based computer code.

26. The computer-readable medium of claim 22, wherein the event handler module is further configured to remove an event handler method from the invocation list during execution of the object-based computer code.

27. The computer-readable medium of claim 26, wherein the event handler module is further configured to use an event accessor to remove the event handler method from the invocation list during execution of the object-based computer code.

28. The computer-readable medium of claim 26, wherein the event handler module is further configured to use a subtraction operator to remove the event handler method from the invocation list during execution of the object-based computer code.

29. An object-based programming system comprising a computer configured to:

invoke an event handler method configured to handle a static event, using a delegate, by calling another method, wherein the other method references the event handler method, and the delegate contains a reference to the other method;

pass a sender parameter identifying an event source and an event arguments parameter to the other method and to the event handler method, parameter lists of the event handler method and the other method having compatible signatures, wherein the events argument parameter comprises a package of a plurality of event arguments;

create an invocation list associated with the other method, the invocation list specifying one or more event handler methods to be invoked;

alter contents of the invocation list during execution of the object-based computer code; and reference the static event using a member access of the form E.M, wherein E denotes a type and M denotes the static event.

30. The object-based programming system of claim 29, wherein the computer is further configured to add an event handler method to the invocation list during execution of the object-based computer code.

31. The object-based programming system of claim 30, wherein the computer is further configured to use an event accessor to add the event handler method to the invocation list during execution of the object-based computer code.

32. The object-based programming system of claim 30, wherein the computer is further configured to use an addition operator to add the event handler method to the invocation list during execution of the object-based computer code.

33. The object-based programming system of claim 29, wherein the computer is further configured to remove an event handler method from the invocation list during execution of the object-based computer code.

34. The object-based programming system of claim 33, wherein the computer is further configured to use an event accessor to remove the event handler method from the invocation list during execution of the object-based computer code.

35. The object-based programming system of claim 33, wherein the computer is further configured to use a subtraction operator to remove the event handler method from the invocation list during execution of the object-based computer code.

36. An object-based programming system comprising a computer configured to:

invoke an event handler method configured to handle a static event, using a delegate, by calling another method of an instance of a class for which parameters passed to the other method are also passed to the event handler method, wherein the parameters passed to the other method and to the event handler method comprise a sender parameter identifying an event source and an event arguments parameter comprising a package of a plurality of event arguments, a parameter list of the other method having a same signature as a parameter list of the event handler method, wherein the other method references the event handler method, and the delegate contains a reference to the other method;

create an invocation list associated with the other method, the invocation list specifying one or more event handler methods to be invoked;

dynamically alter contents of the invocation list; and reference the static event using a member access of the form E.M, wherein E denotes a type and M denotes the static event.

37. The object-based programming system of claim 36, wherein the computer is further configured to add an event handler method to the invocation list during execution of the object-based computer code.

38. The object-based programming system of claim 37, wherein the computer is further configured to use an event accessor to add the event handler method to the invocation list during execution of the object-based computer code.

39. The object-based programming system of claim 36, wherein the computer is further configured to use an addition operator to add the event handler method to the invocation list during execution of the object-based computer code.

40. The object-based programming system of claim 36, wherein the computer is further configured to remove an event handler method from the invocation list during execution of the object-based computer code.

41. The object-based programming system of claim 40, wherein the computer is further configured to use an event accessor to remove the event handler method from the invocation list during execution of the object-based computer code.

42. The object-based programming system of claim 40, wherein the computer is further configured to use a subtraction operator to remove the event handler method from the invocation list during execution of the object-based computer code.

* * * * *

UNITED STATES PATENT AND TRADEMARK OFFICE

CERTIFICATE OF CORRECTION

PATENT NO. : 6,951,022 B1
APPLICATION NO. : 09/808263
DATED : September 27, 2005
INVENTOR(S) : Peter H. Golde et al.

It is certified that error appears in the above-identified patent and that said Letters Patent is hereby corrected as shown below:

On the Title Page, Item (56), under "Other Publications", line 1, delete "Viusual" and insert -- Visual --, therefor.

In column 1, line 24, after "one" delete ",".

In column 3, line 64, after "invention" delete "," and insert -- . --, therefor.

In column 4, line 45, after "includes" delete ".".

In column 4, line 57, after "The" delete ",".

In column 6, line 18, delete "." before "120".

In column 9, line 42, delete "OnXxx ." and insert -- OnXxx. --, therefor.

In column 15, line 50, delete "Click Handler" and insert -- ClickHandler --, therefor.

In column 16, line 52, delete "+and" and insert -- + and --, therefor.

In column 17, line 44, below "{ . . . };" insert -- } --.

In column 18, line 21, after "{ . . . }" insert -- ; --.

In column 18, line 40, delete "= Empty" and insert -- Empty = --, therefor.

In column 18, line 52, after "OkButton;" delete ".".

In column 20, line 17, in Claim 6, delete "object based" and insert -- object-based --, therefor.

UNITED STATES PATENT AND TRADEMARK OFFICE

CERTIFICATE OF CORRECTION

PATENT NO. : 6,951,022 B1
APPLICATION NO. : 09/808263
DATED : September 27, 2005
INVENTOR(S) : Peter H. Golde et al.

It is certified that error appears in the above-identified patent and that said Letters Patent is hereby corrected as shown below:

In column 21, line 4, in Claim 15, after “static” delete “an”.

Signed and Sealed this

Eighth Day of September, 2009

David J. Kappos
*Director of the United States Patent and Trademark Office*